United States Patent [19]

Plach et al.

[11] Patent Number: 5,578,241
[45] Date of Patent: Nov. 26, 1996

[54] LIQUID CRYSTAL DISPLAY

[75] Inventors: Herbert Plach, Darmstadt; Bernhard Rieger, Münster-Altheim; Volker Reiffenrath, Rossdorf; Eike Poetsch, Mühltal, all of Germany

[73] Assignee: Merck Patent Gesellschaft Mit Beschrankter Haftung, Darmstadt, Germany

[21] Appl. No.: 63,093

[22] Filed: May 18, 1993

[51] Int. Cl.$^6$ ............................ C09K 19/52; G02F 1/13
[52] U.S. Cl. .................... 252/299.01; 252/299.4; 252/299.61; 252/299.63; 359/75; 359/103; 428/1
[58] Field of Search .................... 252/299.01, 299.6, 252/299.61, 299.63, 299.4, 299.66, 299.65, 299.67; 359/103, 75; 428/1

[56] References Cited

U.S. PATENT DOCUMENTS

| | | | |
|---|---|---|---|
| 5,032,313 | 7/1991 | Goto et al. | 252/299.63 |
| 5,122,297 | 6/1992 | Reiffenrath et al. | 252/299.63 |
| 5,186,985 | 2/1993 | Estes et al. | 428/1 |
| 5,230,829 | 7/1993 | Bartmann et al. | 252/299.63 |
| 5,242,618 | 9/1993 | Krause et al. | 252/299.6 |
| 5,250,220 | 10/1993 | Wechtler et al. | 252/299.61 |
| 5,323,251 | 6/1994 | Coates et al. | 359/103 |

FOREIGN PATENT DOCUMENTS 4328524  1/1992  Japan .

OTHER PUBLICATIONS

CA 118:112825. 1992.
Plach et al., "Broad Range Liquid Crystal Mixtures for Active Matrix Displays," presented at SID '92, Boston, Mass (May 17–22, 1992).
Plach et al., SPIE vol. 1815 Display Technologies, pp. 256–267 (Dec. 1992).

Primary Examiner—Shean C. Wu
Attorney, Agent, or Firm—Millen, White, Zelano & Branigan, P.C.

[57] ABSTRACT

The invention relates to a liquid crystal display element which contains an electrically switchable, dielectrically positive twisted nematic liquid crystal layer between two substrates which together with a frame form a cell, and two layers with alignment layers thereon applied to the substrates. The liquid crystal mixture is based on SFM compounds. One of the electrodes forming an active matrix of non-linear switching elements is integrated within each picture element while the other electrode is the counter electrode. The alignment layer is an organic polymer layer which may be essential uniformly aligned by rubbing. The alignment layer results in an essential homogenous surface alignment of the liquid crystal layer with a surface tilt angle. The liquid crystal material comprises at least 30 wt. % of one or more compounds according to formula I

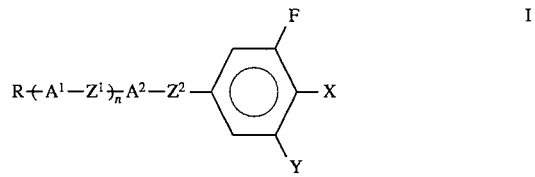

wherein R, $Z^1$, $Z^2$, $A^1$, $A^2$, X, Y and n are herein defined, and the alignment layer is based on at least partially fluorinated polyimides.

26 Claims, 2 Drawing Sheets

LIQUID CRYSTAL DISPLAY

SUMMARY OF THE INVENTION

The invention relates to a liquid crystal display which contains an electrically addressable, dielectric fly positive twisted nematic liquid crystal layer between two substrates which together with a frame form a cell, said liquid crystal layer consisting of a liquid crystal mixture being essentially based on SFM compounds, two electrode layers with alignment layers thereon being applied to said substrates with one of the electrodes forming an active matrix of non-linear addressing elements being integrated with each picture element while the other electrode being the counter electrode, said alignment layer being an organic polymer layer which may be essentially uniformly aligned by rubbing and said alignment layer resulting in an essentially homogenous surface alignment of the liquid crystal layer with a surface tilt angle.

Active addresses liquid crystal displays (AMDs) have become one of the most promising, high performance flat panel displays. Active driving schemes are especially useful for displays with high information content. The non-linear elements used for preparing the active matrix type electrode film can have 2 (for example, diodes such as MIM (=metal-insulator-metal) or MSI (=metal-silicon nitrideindium tin oxide or varistores) or 3 connections (for example, TFT= thin-film transistor). Details about the addressing of liquid crystal displays by an active matrix of non-linear elements can be found, for example, in A. H. Firester, SID, 1987, Society for Information Display Seminar, Seminar 5: Active Matrices for Liquid Crystals.

Liquid crystal materials for active matrix displays have to exhibit a high specific resistivity which has to be maintained in the display even under severe environmental conditions, as, for example, at high ambient temperatures, or after exposure to high temperatures and high levels of UV radiation (see H. J. Plach et al., Solid State Technology, 1992, 186). This is related to the fact, that each image point represents a capacitive load with respect to the particular non-linear element which is charged at the rhythm of the addressing cycle. In this cycle, it is of paramount importance that the voltage applied to an addressed image point drops only slightly until the image point is again charged in the next addressing cycle. A quantitative measure of the drop in voltage is the so-called holding-ratio (HR) which is defined as the ratio of the drop in voltage across a picture element in the nonaddressed state to the voltage applied (see, for example, Rieger, B. et al., Conference Proceeding der Freiburger Arbeitstagung Flüssiglaistalle (Freiburg Symposium on Liquid Crystals), Freiburg 1988.

These demands can be fulfilled by liquid crystal materials being based on SFM materials (=super fluorinated liquid crystal materials, see for example, H. J. Plach et al., SID, International Symposium 1990, Las Vegas, Digest of Technical Papers, Las Vegas 1990, 62 and H. J. Plach et al., SID, International Display Research Conference, Eurodisplay Conference 1990, Amsterdam, Proc. 10th Int. Disp. Conf., Amsterdam, 1990, 136).

Another practical problem encountered in active matrix displays is the occurrence of domains of reverse tilt (see, for example, A. Miyaji et al., IEEE Trans. Elec. Dev. 24 (1977), 811, A. Toda et al., Japan. J. Appl. Phys., 17, 1978). This phenomenon which is distinctly favored in case of low tilt-orientation layers leads to a degradation of electrooptical properties, in particular of the contrast. The reverse tilt phenomenon was found to be often especially pronounced at higher operating temperatures (S. Shimada et al., Japn. J. Appl. Phys., 30 (1991), 3308).

In order to reduce the reverse tilt phenomenon, it has been proposed to use matched combinations of orientation layers and liquid crystal materials which yield higher surface tilt angles (A. Sawada et al., IEICE Tech. Reports, ED 91-72, OME 91-35, 1991, 1, Y. Tanaka et al., International Symposium 1992, Boston, Digest of Technical Papers, Boston, 1992, 43).

The prosed materials and combinations, however, when being incorporated into active matrix displays, were found to fulfill the various requirements and, in particular, the demand for a reduced tendency for forming reverse tilt phases only to an insufficient degree. These materials were further found to exhibit a rather high dependency of tilt angle on temperature which is unsatisfactory or even unacceptable for many practical applications.

It was an object of the present invention to provide improved liquid crystal cells which are characterized by a reduced tendency to form reverse tilt domains compared with state of the art displays, It was another object of the present invention to provide improved combinations of liquid crystal materials and orientation layer which do not exhibit the shortcomings of state of the art combinations or exhibit them only to a lesser extent. Other objects of the present invention are evident to the expert from the following detailed description.

DETAILED DESCRIPTION OF THE INVENTION

Figure 1:
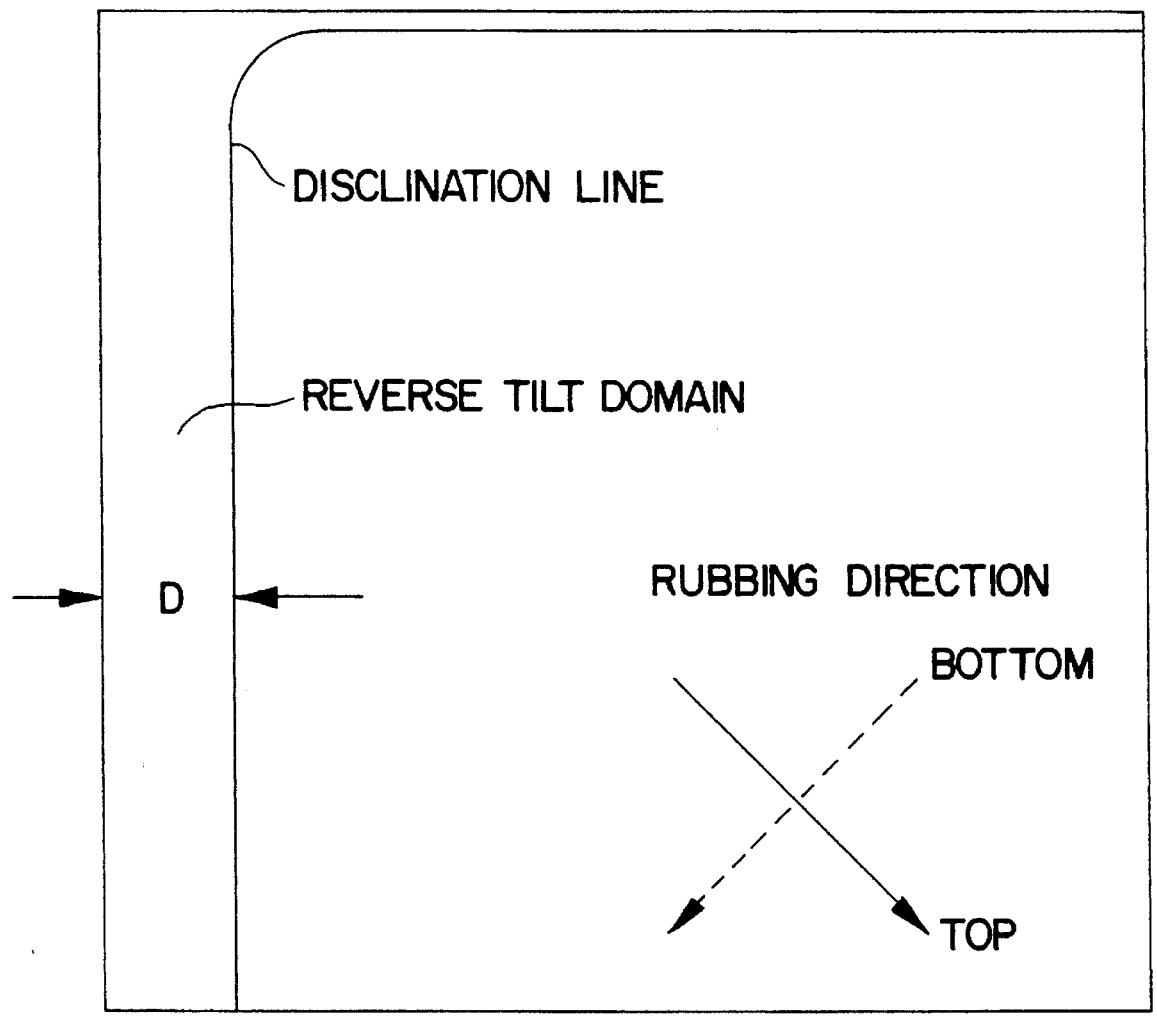
FIG. 1 displays the thickness D of the reverse tilt domain at left-handed.

It was found that these objects can be solved by the liquid crystal displays according to the present invention which contain an electrically switchable, dielectrically positive twisted nematic liquid crystal layer between two substrates which together with a frame form a cell, said liquid crystal layer consisting of a liquid crystal mixture being essentially based on SFM compounds, two electrode layers with alignment layers thereon being applied to said substrates with one of the electrodes forming an active matrix of non-linear switching elements being integrated with each picture element while the other electrode being the counter electrode, said alignment layer being an organic polymer layer which may be essentially uniformly aligned by rubbing, said alignment layer resulting in an essentially homogenous surface alignment of the liquid crystal layer with a surface tilt angle, characterized in that the liquid crystal material comprises at least 30 wt. % of one or more compounds according to formula I

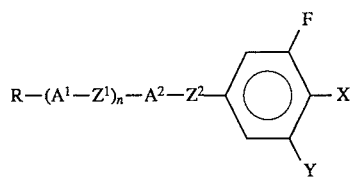

wherein

R is alkyl with up to 12 C atoms wherein one or two non-adjacent $CH_2$-groups may also be replaced by —O—, —CO—, —COO—, —OCO— and/or —HC=CH—, $Z^1$ and $Z^2$ and in case n=2 also the two groups $Z^1$ independently from each other are a single bond, —$CH_2CH_2$—, —COO—, —OCO—, —C≡C—, —$CH_2O$— or —$OCH_2$, $A^1$ and $A^2$ and in case n=2 also the two groups $A^1$ independently from each other are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, one of $A^1$ and $A^2$ may also be pyrimidine-2,5-diyl, pyridine-2,5-diyl or trans-1,3-dioxane-2,5-diyl, X is —Q—P, P is —F, —Cl or —NCS, Q is —$(O)_m$—$C_sF_pH_{2s-p}$ or a single bond, Y is —H, —F or —Cl, m is 0 or 1, s is 1, 2, 3 or 4, p is an integer from 0 to $2_s$, n is 0, 1 or 2, and the alignment layer is being based on partially fluorinated polyimides.

The invention relates to these liquid crystal displays and furthermore to combinations of materials to be used in liquid crystal displays comprising liquid crystal materials which contain at least 30 wt. % of one or more compounds according to formula I and at least partially fluorinated polyimides.

The construction of the electrooptical systems according to the present invention corresponds to the mode of construction customary for systems of this type. The term customary mode of construction is m this case broadly interpreted and includes adaptations and modifications.

The electrooptical systems according to the invention contain at least one electrically addressable, dielectrically positive, twisted nematic liquid-crystal layer which has a twist angle 0<ψ≦170° and is located between 2 substrates or outer plates which, together with a frame, form a cell. The term nematic is broadly drawn here and also includes nematic-cholesteric liquid crystals.

Liquid-crystal cells having twist angles W between about 80° and 170°, preferably between 80°–120° and specifically between 80°–100° are usually known as TN (twisted nematic) cells; the structure of such cells is described, for example, in Thermotropic Liquid Crystals, G. W. Gray [ed.], pp, 77. Liquid-crystal cells in which ψ>180° are generally known as STN (supertwisted nematic) cells, while the term LTN (lowtwisted nematic) cell has been proposed in P 40 10 503 for cells in which ψ<80°.

The insides of the substrates are provided with electrode layers, with one of them forming an active matrix of non-linear switching elements being integrated with each picture element while the other electrode forms the counter electrode. When non-linear elements with 3 connections are used, only one connection is usually required for the counter electrode, while in case of active matrix addressings which are based on elements having 2 connections, the counter electrode is usually scanned.

However, active matrix addressings based on non-linear elements with 2 connections and in which only one electrode is scanned have also been proposed (Y. Baron et al., Proceedings of the 6th International Research Conference 1986, Japan Display '86, p. 86), and furthermore the use of TFTs as an element having only 2 connections has also been discussed (C. Hilsum et al., Displays, January 1986, p. 37).

The display can be provided with a color filter, and further layers, such as, for example compensation and insulation layers, may be arranged between the electrode and alignment layers.

The insides of the substrates are provided with alignment layers which are in direct contact with the liquid crystal and cause the liquid-crystal molecules to adopt an essentially planar edge or surface alignment. The liquid crystal molecules exhibit a certain tilt angle or pretilt Θ; the alignment of TN and LTN cells is usually termed as low-flit alignment because the tilt-angle is typically <10°.

A planar alignment layer with a small pretilt Θ can be produced using polymer layers, for example polyimide or polyvinyl alcohol layers, which arc given a uniform alignment, for example, by rubbing, if necessary with simultaneous use of pressure.

A review of alignment techniques customary hitherto is given, for example, in Thermotropic Liquid Crystals, G. W. Gray [ed.], pp. 75–77.

A problem often encountered m active-matrix liquid crystal displays is that the polymeric orientation layer which is difficult to clean, results in a contamination of the liquid crystal material, and thus in a reduction in the electrical resistance of the liquid crystal.

It has now been found that active-matrix liquid crystal displays of the TN or LTN type can be obtained which exhibit a rather high tilt angle and a preferred temperature dependence of the tilt angle, a distinctly reduced tendency to produce reversed tilt domains, and a high holding ratio if the liquid crystal material comprises at least 30 wt. % of one or more compounds according to formula I

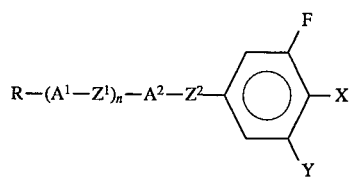

I wherein

R is alkyl with up to 12 C atoms wherein one or two non-adjacent $CH_2$-groups may also be replaced by —O—, —CO—, —COO—, —OCO— and /or —HC=CH—, $Z^1$ and $Z^2$ and in case n=2 also the two groups $Z^1$ independently from each other are a single bond, —$CH_2CH_2$—, —COO—, —OCO—, —C≡C—, —$CH_2O$— or —$OCH_2$, $A^1$ and $A_2$ and in case n=2 also the two groups $A^1$ independently from each other are trans-1,4-cyclohexylene, 1,4-phenylene, 2-fluoro-1,4-phenylene, 3-fluoro-1,4-phenylene, 2,3-difluoro- 1,4-phenylene or 3,5-difluoro- 1,4-phenylene, one of $A^1$ and $A^2$ may also be pyrimidine-2,5-diyl, pyridine-2,5-diyl or trans-1,3-dioxane-2,5-diyl, X is —Q—P, P is —F, —Cl or —NCS, Q is —$(O)_m$—$C_sF_pH_{2s-p}$ or a single bond, Y is —H, —F or —Cl, m is 0 or 1, s is 1, 2, 3 or 4, p is integer from 0 to 25, n is 0, 1 or 2, and the alignment layer is being based on at least partially fluorinated polyimides.

In the following, for the sake of simplicity, Phe is 1,4-phenylene, Phe.2F is 2-fluoro-1,4-phenylene, Phe.3F is 3-fluoro-1,4-phenylene, Cyc is trans-1,4-cyclohexylene, Pyr is pyrimidine-2,5-diyl and Pyd is pyridine-2,5-diyl, the two abbreviations Pyr and Pyd comprising in each case the two possible positional isomers. Furthermore, Phe.(F) is intended to designate a 1,4-phenylene group which is unsubstituted or monosubstituted in 2- or 3-position.

The term SFM-compounds (superfluorinated liquid crystal materials) describes polar calamatic liquid crystal compounds in which one of the two terminal groups is F, Cl, NCS or —(O)$_m$—C$_s$F$_p$H$_{2s+1-p}$ and, in particular, F, Cl or —(O)$_m$—C$_s$F$_p$H$_{2s+1-p}$.

The liquid crystal compounds according to formula I are a preferred subclass of SFM compounds.

Liquid crystal displays whose liquid crystal mixtures comprises at least 30 wt. %. of one or more compounds of formula I, among them at least one binocular compound of formula I2, are preferred:

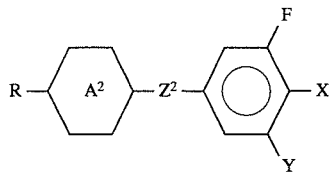

In the compounds of the formula I2, K is preferably alkyl or alkoxy having 1–10, but in particular 1–8 C atoms, the straight-chain radicals being preferred. Furthermore, n-alkoxyalkyl compounds and in particular n-alkoxymethyl and n-alkoxyethyl compounds are preferred.

$Z^2$ is preferably —CH$_2$CH$_2$—, —COO— or a single bond, in particular a single bond or —CH$_2$CH$_2$— and very particularly by a single bond.

X is —F, —Cl, —OCHF$_2$, —OCF$_3$ or —CF$_3$, preferably —F, —Cl, —OCHF$_2$ or OCF$_3$

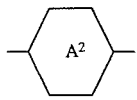

is preferably Cyc, Phe.(F), Phe.3F5F, Phe.2F3F, Pyr, Pyd or Dio, in particular, Cyc, Phe.(F), Phe.3F5F, Phe.2F3F, Pyr or Pyd and very specifically Phe.3F5F.

Especially preferred are liquid crystal displays the liquid crystal mixture of which contains at least one compound according to formula I2 wherein

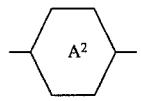

is Phe.3F5F and/or wherein Y is F.

Furthermore, preferred are liquid crystal displays whose liquid crystal mixtures comprises at least 30 wt. % of one or more compounds of formula I, among them at least one trinuclear compound of formula I3:

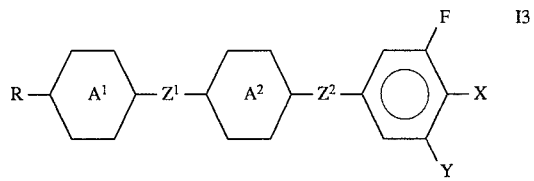

In the compounds of formula I3, R is preferably n-alkyl or n-alkoxy having 1–10 C atoms, furthermore also n-alkoxymethyl or n-alkoxyethyl having 1–8 C atoms and n-alkenyl having up to 9 C atoms.

Very particular preference is given to compounds of formula I3 in which R is methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxymethyl, ethoxymethyl, propoxymethyl, butoxymethyl, methoxyethyl, ethoxyethyl, propoxyethyl, prop-2-en, but-3-en, pent-4-en, hex-5-en, hept-6-en, oct-7-en or non-8-en. $Z^1$ and $Z^2$ in the compounds of formula I3 are, independently of one another, preferably —CH$_2$CH$_2$—, or a single bond and in particular —CH$_2$CH$_2$— or a single bond. Particular preference is given to those compounds of the formula I3 in which at least one of $Z^1$ or $Z^2$ is a single bond, X preferably is —F, —Cl—, —OCHF$_2$, —OCF$_3$ or —CF$_3$ and, in particular —F, —Cl, —OCHF$_2$ or OCF$_3$,

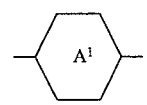

and

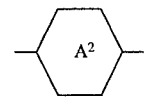

are, independently of one another, Cyc, Phe.(F), Phe.2F3F, Phe.3F5F, Phe.2F3F5F, Pyr, Pyd and Dio, in particular Cyc, Phe.(F), Phe.2F3F, Phe.3F5F, Phe.2F3F5F, Pyr and Pyd and specifically Cyc, Phe.(F), Phe.2F3F, Phe.3F5F, Pyr or Pyd.

Especially preferred age liquid crystal displays the liquid crystal mixture of which contains at least one compound according to formula I3 wherein

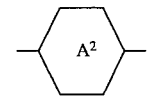

is Phe.3F5F and/or Y is F.

Furthermore, preferred are liquid crystal displays whose liquid crystal mixtures comprise at least 30 wt. % of one or more compounds of formula I, among them at least one tetranuclear compound of formula I4:

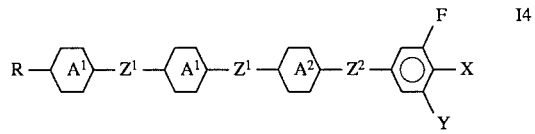

In the compounds of the formula I4, R is preferably n-alkyl or n-alkoxy having 1–10 C atoms, furthermore also n-alkoxymethyl or n-alkoxyethyl having 1–8 C atom.

Very particular preference is given to compounds of the formula I4 in which R is methyl, ethyl, propyl, butyl, pentyl, hexyl, heptyl, octyl, nonyl, decyl, methoxy, ethoxy, propoxy, butoxy, pentoxy, hexoxy, heptoxy or octoxy.

In the compounds of the formula I4, preferably not more than 2 and in particular not more than one of the bridging groups $Z^1$ and $Z^2$ are different from a single bond.

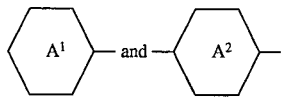

preferably are independently of one another, Cyc, Phe. 2F, Phe.3F, Phe, Pyr or Pyd. Compounds of the formula 14 in which are least one of

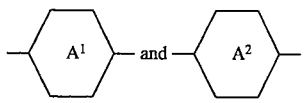

is Phe.2F or Phe.3 F are preferred; specifically preferred are compounds of formula I4 in which at least one of

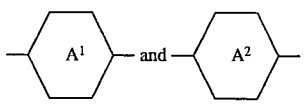

is Phe.3F5F.

In the compounds of Formula I4. X preferably is —F, —Cl, —OCHF$_2$, —OCF$_3$ or —CF$_3$.

The weight proportion of the compounds of the formula I4 in the liquid crystal mixture of the electrooptical systems according to the invention is preferably not too high and is in particular less than 20 %, and, very specifically, not more than 10 %, the use of laterally fluorinated compounds of the formula I4 being in many cases preferred.

Especially preferred are liquid crystal displays the liquid crystal mixture of which contains at least one of the specifically preferred compounds listed below:

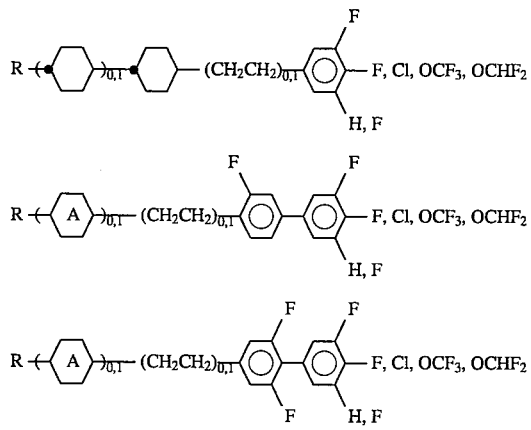

wherein

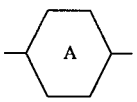

is Cyc or Phe.

Especially preferred are furthermore liquid crystal displays the liquid crystal mixture of which contains at least 30 % of one or more compounds of formula I and additionally at least one compound according to formula II

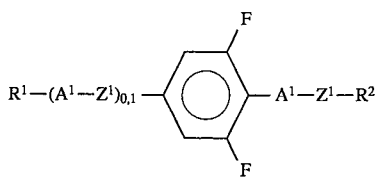

wherein $R^1$ and $R^2$ independently from each other have the meaning given above in formula I for R, one of $R^1$ and $R^2$ may also be a SFM-group, in particular F, Cl or —(O)$_m$—C$_s$F$_p$H$_{2s+1-p}$, and $A^1$ and $Z^1$ independently from each other have the meaning indicated above in formula I.

Especially preferred are displays the liquid crystal mixture of which contains at least 30 % of one or more compounds of formula I and additionally at least one compound of formula II wherein $R^2$ denotes a SFM group.

The proportion of the compounds of formula I in the liquid crystal mixtures used according to the invention is at least 30%, in particular, not less than 35% and very specifically at least 40%. The liquid crystal mixture can contain SFM compounds other than defined by formula I and subformulae 12-I4, and the overall percentage of SFM compounds preferably is not less than 50% and in particular 60% or more up to 100%.

The liquid crystal mixtures used according to the present invention can contain further components which arc preferably selected from nematic or nematogenic (monotropic or isotropic) substances, in particular substances from the group comprising azoxybenzenes, benzylideneanilines, biphenyls, terphenyls, phenyl or cyclohexyl benzoates, phenyl or cylcohexyl cylcohexanecarboxylates, phenyl or cyclohexyl cylcohexylbenzoates, phenyl or cyclohexyl cyclohexylcylcohexanecarboxylates, cylcohexylphenyl benzoates, cyclohexylphenyl cylcohexanecarboxylates, or cyclohexylphenyl cyclohexylcylohexanecarboxylate, phenylcylcohexanes, cyolohexylbiphenyls, phenylcylcohexyl-cyclohexanes, cyclohexylcyclohexanes, cyclohexylcyclohexylcyclohexenes, cylcohexylcyclohexenes, 1,4-bis(cyclohexyl)benzenes, 4,4'-bis(cylcohexyl)biphenyls, phenyl- or cyclohexylpyrimidines, phenyl- or cylcohexylpyridines, phenyl- or cyclohexyldioxanes, phenyl- or cyclohexyl-1,3-dithianes, 1,2-diphenylethanes, 1,2-dicyclohexylethanes. 1-phenyl-2-cyclohexylethanes, 1-cyclohexyl-2-(4-phenylcyclohexyl)ethanes, 1-cyclohexyl-2-biphenylethanes, 1-phenyl-2-cylcohexylphenylethanes, halogenated or unhalogenated stilbenes, benzyl phenyl ethers, tolans and substituted cinnamic acids. The 1,4-phenylene groups in these compounds can also be mono-, di- or tri-fluorinated, in particular monofluorinated.

The liquid crystal mixtures used in the liquid crystal displays according to the invention preferably also contain one or more dielectrically neutral compounds of the formulae 1–5:

R''—L—E—R'''      1

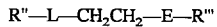

R''—L—CH$_2$CH$_2$—E—R'''      2

In the formulae 1 and 2 L and E, which may be identical or different, are each, independently of one another, a bivalent radical from the group comprising -Phe-, -Cyc-, -Phe-Phe-, -Phe-Cyc-, -Cyc-Cyc-, -Pyr-, -Dio-, -G-Phe- and -G-Cyc and mirror images thereof; Phe being unsubstituted or fluorinesubstituted 1,4-phenylene, Cyc being trans-1,4- cyclohexylene or 1,4-cyclohexylene, Pyr being pyrimidine-2,5-diyl or pyridine-2,5-diyl, Dio being 1,3-dioxan6-2,5-diyl and G being 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The liquid crystals according to the invention preferably contain one or more components selected from compounds of the formulae 1 and 2, in which L and E are selected from the group comprising Cyc, Phe and Pyr and simultaneously one or more components are selected from the compounds of the formulae 1 and 2, in which one of the radicals L and E is selected from the group comprising Cyc, Phe and Pyr and the other radical is selected from the group comprising-Phe-Phe-, -Phe-Cyc-, -Cyc=Cyc-, -G-Phe- and -G-Cyc-, and, if desired, one or more components are selected from the compounds of the formulae 1 and 2, in which the radicals L and B are selected from the group comprising -Phe-Cyc-, -Cyc-Cyc-, -G-Phe- and-G-Cyc-.

R''' and R'' in the compounds of the formulae 1 and 2 are each, independently of one another, preferably alkyl, alkenyl, alkoxy, alkenoxy or alkanoyloxy having up to 8 carbon atoms. In most of these compounds R''' and R'' are different from one another, one of these radicals being in particular alkyl, alkoxy or alkenyl.

Especially preferred is the following smaller group of dielectrically neutral compounds of formulae 3 and 4

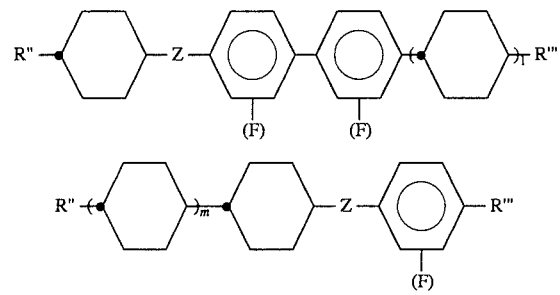

wherein
the meaning of R'' and R''' is the same as given for formulae 1 and 2,

Z is independently from each other a single bond or —CH$_2$CH$_2$—, l and m are independently from each other 0 or 1, and

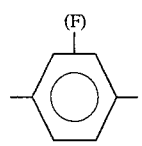

denotes 1,4 phenylene, 2-fluoro-1,4-phenylene or 3-fluoro-1,4-phenylene.

The weight proportion of the compounds of the formulae 1–4 in the liquid crystals used according to the invention is preferably 0–50%, in particular 0–40% and specifically 0–20%.

The liquid crystal mixtures used in the liquid crystal display preferably contain 1–20, in particular 1–15, and very particularly 1–12 compounds of the formula I.

One skilled in the art can select additives for the liquid crystal mixtures described from the large pool of nerouric or nematogenic substances in such a manner that the birefringence Δn and/or the ordinary refractive index n$_o$ and/or other refractive indices and/or the viscosity and/or tho dielectric anisotropy and/or further parameters of the liquid crystal are optimized with respect to the particular application.

The liquid crystal compounds described are known to the expert. They are partly commercially available or they can be prepared by conventional methods which are described, for example, in standard works such as Houben/Weyl, Methoden der organischen Chemie [Methods of organic chemistry], Thieme-Verlag, Stuttgart.

The liquid crystal mixture can contain further additives such as, for example, chiral compounds, dichroitic dyes, and other customary additives. The concentration of such additives is preferably not more than 7.5% and, in particular, lower than 5%. Such additives are known to the expert and are described in detail in the literature H. Kelker, R. Hatz, Handbook of liquid crystals, Verlag Chemie, Weinheim, 1980).

It was found out that liquid crystal displays with improved properties can be obtained if the liquid crystal layer comprises at least 30% of one or more compounds of formula I resp., in particular, one or more of the preferred compounds according to subformulae I2–I4 and if the alignment layer is based on at least partly fluorinated polyimides.

Polyimides can be characterized by the repeating structure element

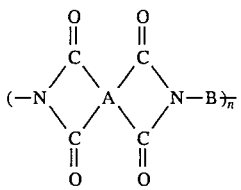

wherein A is one or more residues from an acid dianhydride group and B is one or more residues from dime compounds. Polyimides thus actually rely on long chains of the type

with n varying typically between 15 and 1500.

Polyimides can be obtained by reacting a tetracarboxylic dianhydride component containing at least one compound of formula III

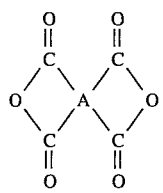

wherein A is a tetravalent organic group, with a diamine component containing at least one compound of formula IV

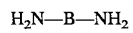

wherein B is a divalent organic group.

Examples of compound HI include aliphatic, alicyclic and aromatic tetracarboxylic anhydrides such as butanetetracarboxylic dianhydride, 1,2,3,4-cyclobutanetretracarboxylic dianhydride, 1,2,3,4-cyclopentanetetracarboxylic dianhydride, 2,3,5-tricarboxycyclopentylacetic dianhydride, 3,5,6-tricarboxynorbomane-2-acetic dianhydride, 2,3,4,5-tetrahydrofurantetracarboxylic dianhydride, 1,2,3a,4,5,9b-hexahydro-5-tetrahydro-2,5-dioxo-3-furanyl)-naphtho[1,2-c]-furan-1,3-dione, 5-(2,5-dioxotetrahydrofuranyl)-3-methyl-3-cyclohexene- 1,2-dicarboxylic dianhydride, bicyclo[2,2,2]-oct-7-ene-2,3,5,6-tetracarboxylic dianhydride, pyromellitic dianhydride, 3,3',4,4'-benzophenonetetracarboxylic dianhydride, 3,3',4,4'-biphenylsulfonetetracaboxylic dianhydride, 1,4, 5, 8-napthalentetracarboxylic dianhydride, 2,3,6, 7-naphthalenetetracarboxylic dianhydride, 3,3',4,4'-biphenyl ether tetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)phenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoro is propylidenediphthalic dianhydride, 3,3',4,4'-biphenyltetracarboxylic dianhydride, bis(phthalic)phenylphosphine oxide dianhydride, p-phenylene-bis(triphenylphthalic) dianhydride, m-phenylenebis(triphenylphthalic) dianhydride, bis(triphenylphthalic)-4, 4'-diphenyl ether dianhydride and bis(triphenylphthalic)-4, 4'-diphenylmethane dianhydride.

In formula IV, B is a divalent organic group which may be straight-chain or branched and aliphatic, alicyclic or aromatic. Especially preferred are polyimides wherein group B preferably is a straight-chain or branched alkylen group with 1–20 C atoms wherein up to 10 $CH_2$ groups may be replaced by —C(=O)—O—, —O—C(=O)—, —NH—C(=O)—, —C=O—, —(C=O)—NH—, —O—, —S—, —HC=CH—, —C≡C— or alicyclic or aromatic ring systems which might be both homo- or heteroatomic with the proviso that two —O— atoms are not directly linked.

Examples of compounds IV include aliphatic, alicyclic and aromatic diamines such as, for example, p-phenylenediamine, m-phenylenediamine, 4,4'-diaminodiphenylmethane, 4,4'-diaminophenylethane, 4,4'-diaminodiphenylsulfide, 4,4'-diaminodiphenylsulfone, 4,4'-diaminodiphenyl ether, 1,5-diaminonaphthalene, 3,3-dimethyl-4,4'-diaminobiphenyl, 4,4'-diaminobenzaniline, 3,4'-diaminodiphenyl ether, 3,3'-di-aminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl] hexafluoro-propane, 2,2-bis(4-aminophenyl)hexafluoropropane, 2,2bis[4-(4-aminophenoxy)-phenyl]-sulfone, 1,4-bis)4-aminophenoxy)benzene, 1,3-bis(4-aminophenoxy)-benzene, 1,3-bis(3-aminophenoxy)benzene, 9,9-bis(4-aminophenyl)-10-hydroanthracene, 9,9-bis(4-aminophenyl)fluorene, 4,4'-methylenebis-(2-chloroaniline), 2,2',5,5'-tretrachloro-4,4'-diaminobiphenyl, 2,2'-dichloro-4, 4'-diamino-5,5'-dimethoxybiphenyl, 3,3'-dimethoxy-4,4'-diaminobiphenyl, diaminotetraphenylthiophene, 1,1-m-xylylenediamine, 1,2-ethylenediamine, 1,3-propanediamine, tetramethylenediamine, pentamethylenediamine, hexamethylenediamine, heptamethylendiamine, octa-methylenediamine, nonamethylenediamine, 4,4-diaminoheptamethylenediamine, 1,4-diaminecyclohexane, iophoronediamine, tetrahydrodicyclopentadienylenediamine and hexahydro4,7-methanoindanylenedimethylenediamine.

The tetracarboxylic dianhydride component and/or the diamine component may contain one or more compounds so that the resulting polyimide contains only one or different groups A and B.

Polyimides containing at least two different groups for A and/or B are preferred.

The term polyimide is used in a broad sense here and comprises also polymers which contain in the main chain other groups than the imid-structure element V such as, for example, amid groups, ester groups, ether groups or other groups. The reaction mixture used to prepare the polyimides to be used in the displays according to the present invention can therefore contain other components than the tetracarboxylic dianhydride and the diamine component, such as, for example, an alcohol component, a monoamine component and/or further components.

The chemical properties of the polyimides used m the alignment layer of the displays according to the present invention can be varied to a wide degree by using different structures for groups A and B and/or two or more different groups A and B.

It was found, for example, that the thermal stability, the glass transition point and the mechanical strength of the polyimides can quite generally be increased if aromatic ring groups are present in both A and B.

B preferably is at least partly fluorinated; polyimides wherein only A is partly fluorinated are often less preferred.

Both A and B may be further substituted, in particular by Cl, CN, $NO_2$.

The compounds according to formula III and IV which are partly commercially available or can be prepared by the expert according to conventional methods, are only intended to illustrate the present invention without limiting it.

The present inventors found that liquid crystal displays of AMD type with improved properties are obtained if A and/or B are at least partly fluorinated. The chemical structure of the polyimide was found to be less critical, and a wide variety of at least partly fluorinated polyimides was found to be useful.

During the preparation of the polymer, polymaic acids are formed as intermediates in a first reaction step which can be imidized in a second reaction step. The term "polyimide" as used in the present invention comprises both the polyamic acid intermediates and the imidized polymer.

The reaction steps are performed according to conventional methods. The first reaction step to the polyamic acid intermediates is usually carried out in an organic solvent at a reaction temperature of typically 0°–150 ° C. and preferably 0°–100 ° C.

The imidization reaction is preferably performed under heat and/or in the presence of a dehydrating agent and/or an imidization catalyst. The temperature for the imidization under heat is usually in the range of 60° to 200 ° C., preferably in the range of 100° to 170 ° C. When the temperature is lower than 60° C., the reaction proceeds slowly. When it exceeds 200° C., the molecular weight of the resulting polymer is liable to decrease greatly. Suitable dehydrating agents are, for example, acid anhydrides such as acetic anhydride, propionic anhydride and trifluoroacetic anhydride. The imidization catalyst can be selected, for example, from tertiary amines such as pyridine, collidine, lutidine and triethylamine, although neither the dehydrating agent nor the catalyst are limited to the preferred compounds listed.

Both reaction steps are typically performed in an organic solvent such as an alcohol, a ketone, an ester, an ether, a halogenated hydrocarbon and hydrocarbon.

Both the polyamic acid intermediates and the imidized successors can be used for preparing the alignment layer of the displays according to the present invention.

B. Rieger et al., Conference Proceeding der Freiburger Arbeitstagung Flüsigkristalle (Freiburg Symposium on Liquid Crystals), Freiburg 1989 have shown that AMDs the alignment layers of which are based on pre-imidized polyimides are often characterized by better values of the holding ratio compared to AMDs the alignment layer of which are based on polyamic acid intermediate products. The term pre-imidized polyimides denotes alignment material which has been subjected to the imidization reaction step but is still soluble in conventional organic solvents.

AMDs according to the present invention, the liquid crystal mixture of which contains at least 30% of one or more compounds of formula I and the alignment layer of which is based on pre-imidized, at least partially fluorinated polyimides are especially preferred.

The AMDs according to the present invention can, however, also contain alignment layers which are based on at least partially fluorinated polyamic acid intermediates or mixtures of at least partially fluorinated polyamic acid intermediates and at least partially fluorinated imidized successors of these intermediates.

The alignment material is applied, usually dissolved in an organic solvent, to the substrates of the displays which were already provided with electrode layers and optionally other layers, such as color filters, separation layers and/or other layers, by spin coating, roll coating, printing methods or other methods.

The alignment layer is then usually heated, typically at a temperature between 80°–220° C., preferably between 120°–200 ° C. The curing temperature is preferably chosen to be not higher than 200° C. because the typically used color filters decompose at higher temperatures.

The thickness of the polyimide coating is usually 0.001 to 1 μm, preferably 0.005–0.5 μm.

The above-described coating is subjected to a rubbing treatment, typically with a roll wrapped with a cloth of a synthetic fibre such as nylon to form a liquid crystal alignment film.

Suitable, at least partly fluorinated polyimides are described, for example, in U.S. Pat. No. 4,749,777, U.S. Pat. No. 4,735,492, U.S. Pat. No. 4,864,008, JP 2-4,225 (Kokai), JP 1-180,860 (Kokai), JP 63-259,515 (Kokai), JP 1-180,518 (Kokai), IP 1-180,519 CKokai), JP 63-313,124 (Kokai), JP 2-4,224 (Kokai), JP 62-127,827 (Kokai), JP 60-270,009 (Kokai), JP 62-87,939 (Kokai) and in U.S. Pat. No. 5,186,985.

The liquid crystal active matrix displays according to the present invention are characterized by advantageous properties and, in particular, by a rather high flit angle and a preferred temperature dependence of the flit angle, a distinctly reduced tendency to produce reversed tilt domains, and a high holding ratio and they thus are of a considerable economic importance.

The present invention will be further explained by the following examples which are intended to illustrate the invention without limiting it.

Throughout the specification percentages are by weight and temperatures are set forth in degrees celsius.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, are hereby incorporated by reference.

EXAMPLES

Example 1 a) Liquid crystal displays according to the present invention were prepared by applying three partly fluorinated pre-imidized polyimides as alignment layer to the substrates.

| designation used in the present specification | provided by company; under the designation |
| --- | --- |
| PI-A 11 | DuPont; "AM-2" (experimental material) |
| PI-A 12 | DuPont; "AM-1" (experimental material) |
| PI-A 13 | DuPont, "PI-2590 D" (experimental material |

For the sake of comparison, a non-pre-imidized alignment material which was obtained from Nissan Chemicals as SE-4110 and will be termed in the following as PI*-S02, and a pre-imidized but not fluorinated alignment material (AL 1051, Japan Synthetic Rubber) were used, which will be termed in the following as PI-A01.

The cells prepared were filled with 4 liquid crystal mixtures M1, M2, M3 and M* . M1–M3 contain at least 30° % of one or more compounds according to formula I while M* which is used for the sake of comparison, does not.

| Liquid crystal mixture | Composition |
| --- | --- |
| M1 | 5% of PCH-5F |
| | 5% of PCH-7F |
| | 8% of CCP-20CF3 |
| | 9% of CCP-30CF3 |
| | 9% of CCP-50CF3 |
| | 11% of ECCP-3F.F |
| | 10% of ECCP-5F.F |
| | 5% of CUP-3F.F |
| | 4% of CUP-5F.F |
| | 8% of CCP-30CF 2.F.F |
| | 14% of CCP-50CF 2.F.F |
| | 6% of CF-30CF3 |
| | 6% of CP-50CF3 |
| M2 | 6% of PCH-5F |
| | 6% of CCH-301 |
| | 5% of CCH-303 |
| | 5% of CCH-501 |
| | 6% of CCP-20CF3 |
| | 7% of CCP-30CF3 |
| | 6% of CCP-40CF3 |
| | 7% of CCP-50CF3 |
| | 7% of ECCP-3F.F |
| | 8% of ECCP-5F.F |
| | 3% of CUP-3F.F |
| | 4% of CUP-5F.F |
| | 11% of CCP-30CF2.F.F |
| | 12% of CCP-50CF2.F.F |
| | 7% of CP-30CF3 |
| M3 | 8% of PCH-6F |
| | 8% of PCH-7F |
| | 8% of ECCP-3F |
| | 8% of ECCP-5F |
| | 5% of CCP-30CF3 |
| | 5% of CCP-50CF3 |
| | 13% of BCH-3F.F |
| | 13% of BCH-5F.F |
| | 14% of ECCP-3F.F |
| | 14% of ECCP-5F.F |
| | 4% of CCH-303 |
| comparative mixture M* | 10% of PCH-5F |
| | 8% of PCH-6F |
| | 6% of PCH-7F |
| | 8% of CCP-20CF3 |
| | 12% of CCP-30CF3 |
| | 9% of CCP-40CF3 |
| | 9% of CCP-50CF3 |
| | 12% of BCH-3F.F |
| | 10% of BCH-5F.F |
| | 5% of ECCP-30CF3 |
| | 5% of ECCP-50CF3 |
| | 2% of CBC-33F |

-continued

| Liquid crystal mixture | Composition |
|---|---|
| | 2% of CBC-53F |
| | 2% of CBC-55F |

The abreviations used in the preceding table have the following meaning:

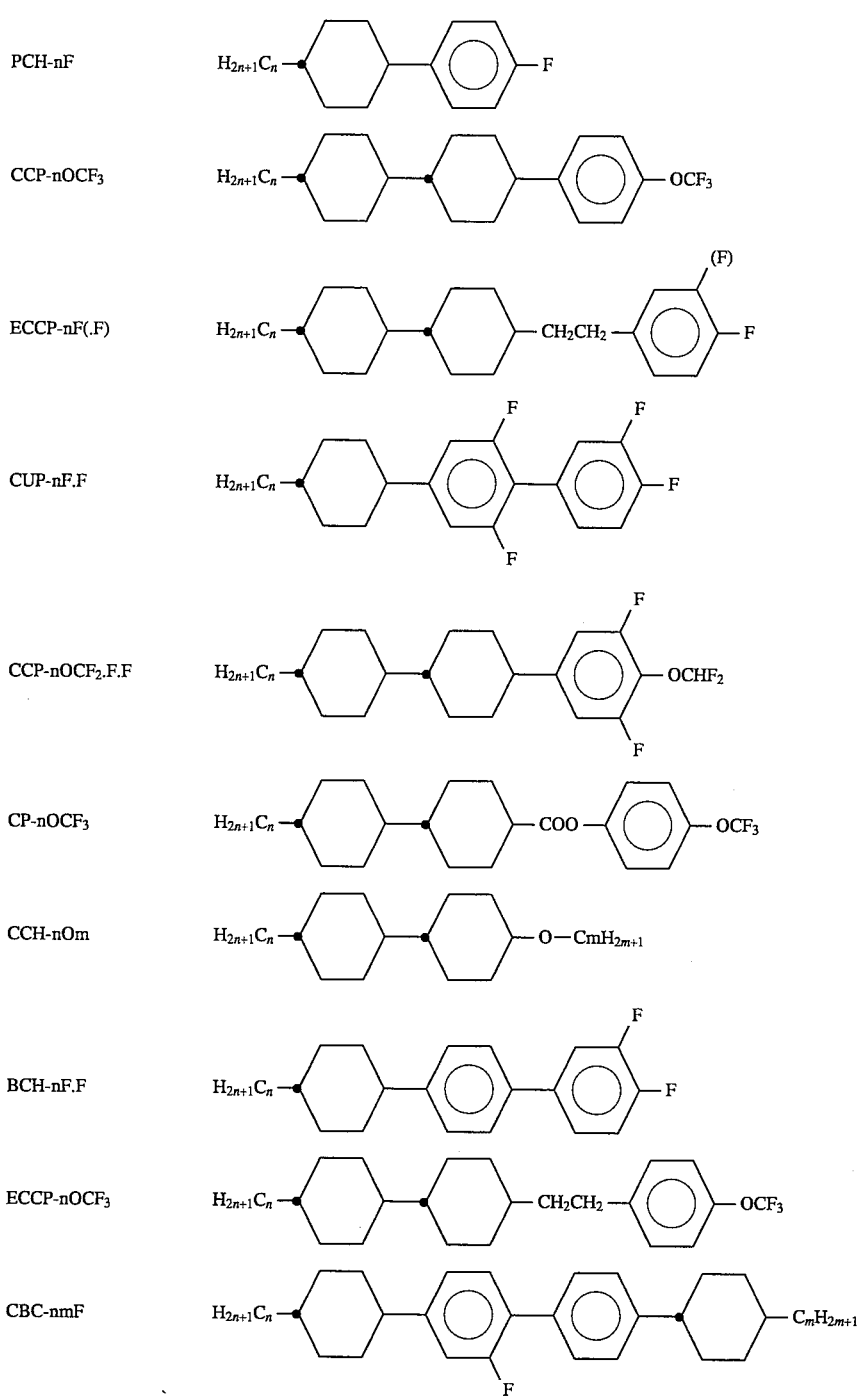

The filled and sealed cells were investigated after heating to the isotropic phase (5 minutes storage at 120° C. and subsequently at ambient temperature over night). The surface tilt angles were measured at 20° C. by the anisotropic crystal rotation method in 50 μm thick cells with antiparallel rubbed orientation layers.

The surface tilt angles for the liquid crystal displays obtained by combining above alignment materials and liquid crystal mixtures, are summarized in the following table.

| orientation layer | tilt angle Θ [°] | | | |
|---|---|---|---|---|
| PI-A 01 | 0.8 | 1.0 | 1.3 | 0.8 |
| PI-A 11 | 1.7 | 1.7 | 4.0 | 1.2 |
| PI-A 12 | 2.7 | 3.9 | 3.9 | 1.5 |
| PI*-S 02 | 3.2 | 3.6 | 4.6 | 3.8 |
| | M1 | M2 | M3 | M* |
| | liquid crystal mixture | | | |

It is evident from this table that liquid crystal displays according to the present invention comprising a liquid crystal mixture M1, M2 or M3 with at least 30% of one or more compounds according to formula I, and a pre-imidized, partly fluorinated polyimide PI-A11 or PI-A22 as alignment layer exhibit distinctly larger tilt angles Θ at 20° C. than a display according to the state of the art comprising a mixture M* which does not fulfill the requirement mentioned.

Using the non pre-imidized alignment layer PI*-SO2 yields AMD-type displays with a high surface tilt angle Θ but the holding ratio is unacceptably low.

b) This is shown in the following table summarizing the tilt angle Θ [°] measured at 20° C. and the holding HR at 20° C. and 100° C. in 5 μm TN cells which were in each case filled with liquid crystal mixture M* while the alignment material was varied as indicated. The electrode area was 1 cm², and the HR measurements were performed using ±1 V pulses with 60 μs pulse width at a refresh rate of 50 Hz.

| orientation layer | HR (20° C.) [%] | HR (100° C.) [%] | Θ (20° C.) [°] |
|---|---|---|---|
| PI-A 01 | 99.5 | 96.8 | 0.8 |
| PI-A 11 | 98.2 | 96.8 | 1.2 |
| PI-A 12 | 97.4 | 96.2 | 1.5 |
| PI-A 13 | 98.0 | 96.6 | 1.8 |
| PI*-SO2 | 96.3 | 70 | 3,8 |

Example 2

We determined the extension of the reverse tilt domain, enclosed by the reversed tilt disclination, for liquid crystal displays obtained by the combinations of M3 and M* with PI-A 01.

The definition of the thickness D of the reverse tilt domain can be taken from FIG. 1. The displays investigated were left-handed, rubbed at an angle of 45 ° to the sides of the electrodes. The pitch of the liquid crystal mixtures was in each case fixed to 90 μm with the chiral dopant S-811 (available through E. Merck, Darmstadt). The width of the reverse tilt domain has been determined by means of an ocular micrometer which the cells were driven with square wave voltages with a frequency of 100 Hz.

Figure 2:
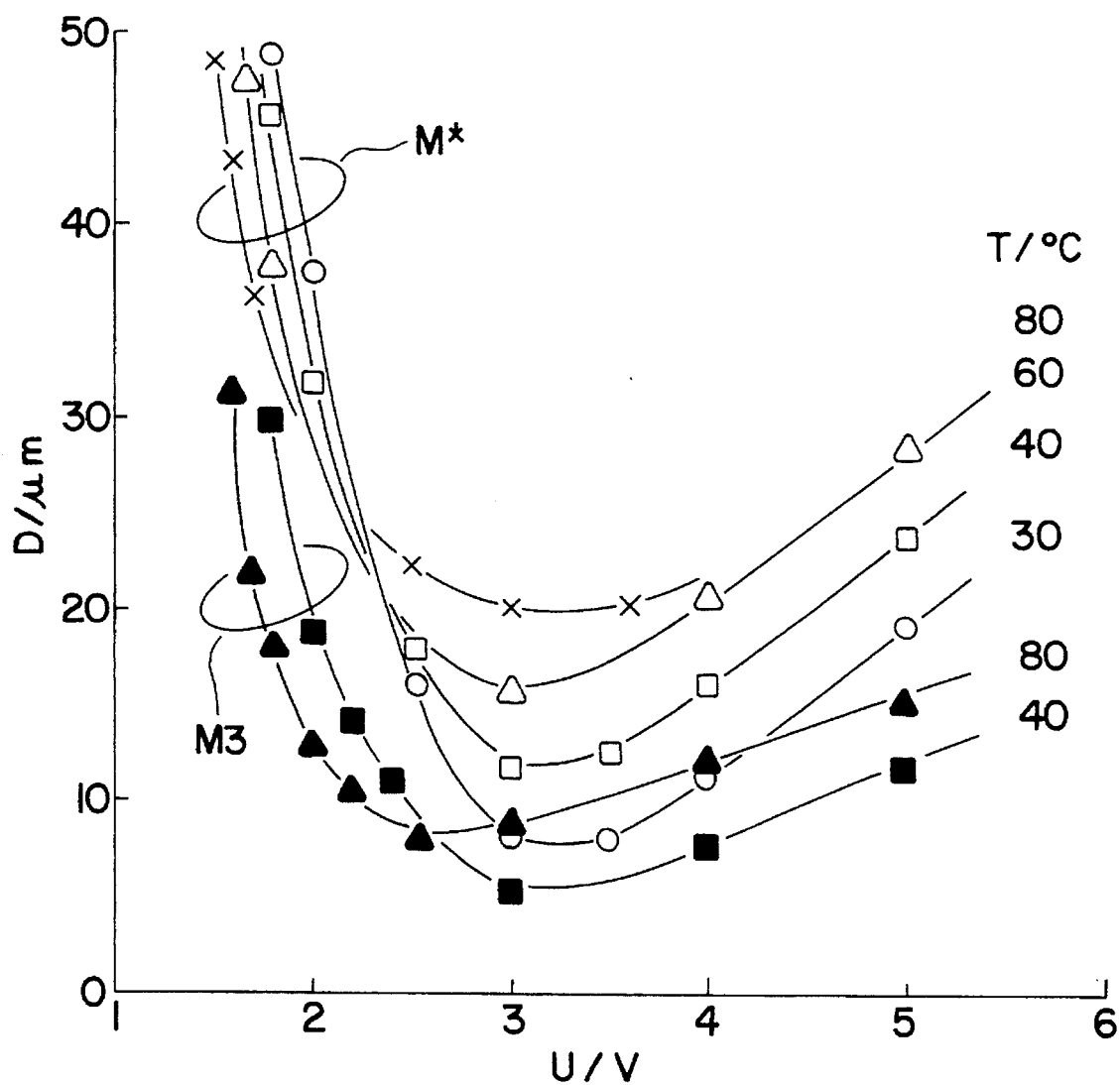
FIG. 2 shows the extension of the reverse tilt domain as a function of the voltage applied to the cell for different temperature.

FIG. 2 shows the extension of the reverse tilt domain as a function of the voltage applied to the cell for different temperatures. The full symbols are referring to a liquid crystal display according to the present invention comprising liquid crystal mixture M3 and pre-imidized alignment material PI-A01 while the empty symbols are referring to a state of the art cell comprising liquid crystal mixture M* and PI-A01 as alignment layer.

It is firstly evident from FIG. 2 that the extension D of the reverse tilt domain is depending on the voltage applied to the cell. Upon increasing the voltage, the reverse tilt domain occurs for both cells at a voltage below the threshold voltage $V_{10}$. Then in both cases it has its biggest extension though this is not very disturbing yet as the relative contrast is still low. With increasing voltage, the extension of the reverse tilt domain decreases for both cells, passes a minimum and increases again for further increasing voltage. At the voltage of the minimum extension of the reverse tilt domain the contrast at the display is already large and therefore the light scattering especially from the diclination line is most disturbing here.

A comparison of the curves for the liquid crystal display containing a liquid crystal mixture according to the invention (full symbol) with the curves for the comparative display (empty symbols) shows that the displays according to the present invention exhibit (i) distinctly less pronounces reverse tilt domains and (ii) a more favorable dependence of the extension of the reversed tilt domain on temperature.

We claim:

1. A liquid crystal display comprising an electrically switchable, dielectrically positive twisted nematic liquid crystal mixture layer between two substrates which together with a frame form a cell, said liquid crystal mixture is essentially based on superfluorinated liquid crystal compounds, two electrode layers, with alignment layers thereon, applied to said substrates, one of said electrode layers forms an active matrix of non-linear switching elements integrated with each picture element, and the other electrode layer is the counter electrode, said alignment layers are each an organic polymer layer which are essentially uniformly alignable by rubbing, said alignment layers resulting in an essential homogeneous surface alignment of the liquid crystal layer with a surface tilt angle, wherein said liquid crystal mixture comprises at least 30 wt. % of one or more compounds according to formula I

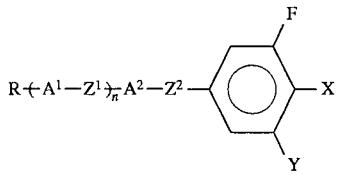

wherein

R is alkyl with up to 12 C atoms or alkyl with up to 12 C atoms wherein one or two non-adjacent $CH_2$-groups are each replaced by —O—, —CO—, —COO—, —OCO— or —HC═CH—, $Z^1$ and $Z^2$ in each case are, independently from each other, a single bond, —$CH_2CH_2$—, —COO—, —OCO—, —C≡C—, —$CH_2$O— or —O$CH_2$—, $A^1$ and $A^2$ in each case are, independently from each other, trans-1,4-cyclohexylene, 1,4-phenylene, 2-fluoro-1,4-phenylene, 3-fluoro-1,4-phenylene, 2,3-difluoro-1,4-phenylene, or 3,5-difluoro-1,4-phenylene, X is —Q—P, P is —F, —Cl or —NCS, Q is —$(O)_m$—$C_sF_pH_{2s-p}$— or a single bond, Y is —H, —F or —Cl, m is 0 or 1, s is 1, 2, 3 or 4, p is an integer from 0 up to 2s, and n is 0, 1 or 2; and said alignment layers are each based on at least partially fluorinated polyimides.

2. A display according to claim 1 wherein each alignment layer is based on pre-imidized, at least partially fluorinated polyimides.

3. A display according to claim 1, wherein said liquid crystal mixture contains at least one compound wherein $A^2$ is 3,5-difluoro-1,4-phenylene and/or Y is F.

4. A display according to claim 1, wherein said liquid crystal mixture contains one or more compounds according to formula II

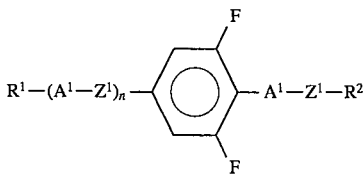

wherein $R^1$ and $R^2$ independently from each other have the meaning given above for R in formula I, one of $R^1$ and $R^2$ may also be —Q—P, and $A^1$, $Z^1$, n, Q and P in each case independently from each other have the meaning given above in formula I.

5. A display according to claim 4 wherein $R^2$ is —Q—P.

6. A method of generating an electrooptical display using a liquid crystal display element, said liquid crystal display element containing an electrically switchable, dielectrically positive twisted nematic liquid crystal layer between two substrates which together with a frame form a cell, the improvement wherein said liquid crystal display element is a liquid crystal display according to claim 1.

7. A method according to claim 6 characterized in that the alignment layer is being based on pre-imidized, at least partially fluorinated polyimides.

8. A method according to claim 6, wherein the liquid crystal mixture contains at least one compound wherein $A^2$ is 3,5-difluoro-1,4-phenylene and/or Y is F.

9. A method according to claim 6, wherein the liquid crystal mixture contains one or more compounds according to formula II

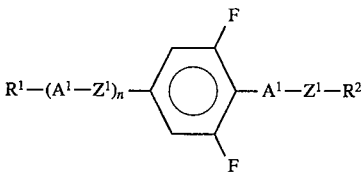

wherein $R^1$ and $R^2$ independently from each other have the meaning given above for R in formula I, one of $R^1$ and $R^2$ may also be —Q—P, and $A^1$, $Z^1$, n, Q and P in each case independently from each other have the meaning given above in formula I.

10. A method according to claim 9 wherein $R^2$ is Q—P.

11. A display according to claim 2, wherein the liquid crystal mixture contains at least one compound wherein $A^2$ is 3,5-difluoro-1,4-phenylene and/or Y is F.

12. A display according to claim 2, wherein the liquid crystal mixture contains one or more compounds according to formula II

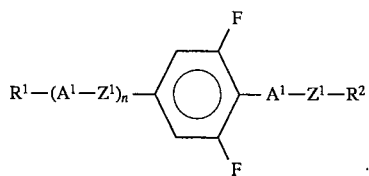

wherein $R^1$ and $R^2$ independently from each other have the meaning given above for R in formula I, one of $R^1$ and $R^2$ may also be —Q—P, and $A^1$, $Z^1$, n, Q and P in each case independently from each other have the meaning given above in formula I.

13. A display according to claim 3, wherein the liquid crystal mixture contains one or more compounds according to formula II

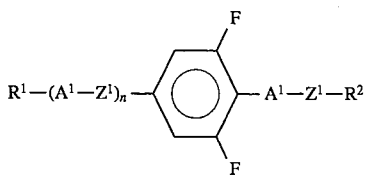

wherein $R^1$ and $R^2$ independently from each other have the meaning given above for R in formula I, one of $R^1$ and $R^2$ may also be —Q—P, and $A^1$, $Z^1$, n, Q and P in each case independently from each other have the meaning given above in formula I.

14. A display according to claim 11, wherein the liquid crystal mixture contains one or more compounds according to formula II

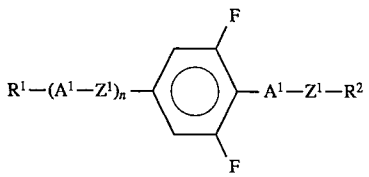

wherein $R^1$ and $R^2$ independently from each other have the meaning given above for R in formula I, one of $R^1$ and $R^2$ may also be —Q—P, and $A^1$, $Z^1$, n, Q and P in each case independently from each other have the meaning given above in formula I.

15. A method according to claim 7, wherein the liquid crystal mixture contains at least one compound wherein $A^2$ is 3,5-difluoro-1,4-phenylene and/or Y is F.

16. A method according to claim 7, wherein the liquid crystal mixture contains one or more compounds according to formula II

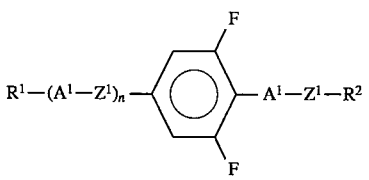

wherein $R^1$ and $R^2$ independently from each other have the meaning given above for R in formula I, one of $R^1$ and $R^2$ may also be —Q—P, and $A^1$, $Z^1$, n, Q and P in each case independently from each other have the meaning given above in formula I.

17. A method according to claim 8, wherein the liquid crystal mixture contains one or more compounds according to formula II

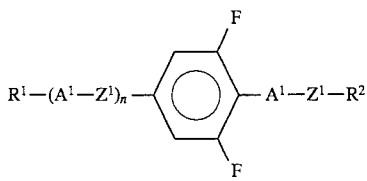

wherein $R^1$ and $R^2$ independently from each other have the meaning given above for R in formula I, one of $R^1$ and $R^2$ may also be —Q—P, and $A^1$, $Z^1$, n, Q and P in each case independently from each other have the meaning given above in formula I.

18. A method according to claim 15, wherein the liquid crystal mixture contains one or more compounds according to formula II

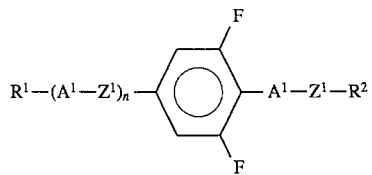

wherein $R^1$ and $R^2$ independently from each other have the meaning given above for R in formula I, one of $R^1$ and $R^2$ may also be —Q—P, and $A^1$, $Z^1$, n, Q and P in each case independently from each other have the meaning given above in formula I.

19. A display according to claim 1, wherein said liquid crystalline mixture contains at least one binuclear compound of formula I2

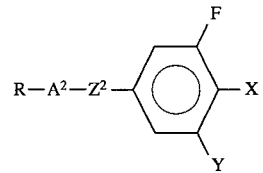

wherein R, $A^2$, $Z^2$, X and Y are as defined in formula I.

20. A display according to claim 1, wherein said liquid crystalline mixture contains at least one trinuclear compound of formula I3

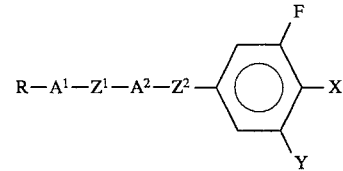

wherein R, $A^1$, $A^2$, $Z^1$, $Z^2$, X and Y are as defined in formula I.

21. A display according to claim 1, wherein said liquid crystalline mixture contains at least one compound of formula I4

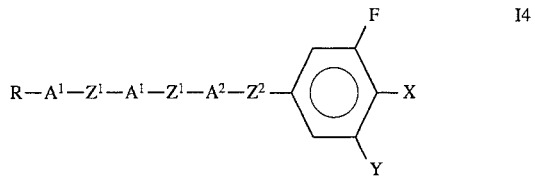

wherein R, $A^1$, $A^2$, $Z^1$, $Z^2$, X and Y are as defined in formula I.

22. A display according to claim 1, wherein said liquid crystalline mixture contains at least one compound of the following formulae:

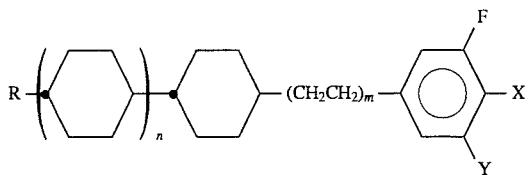

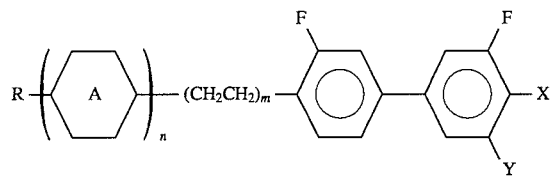

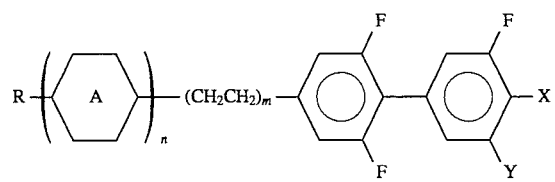

wherein

R is alkyl with up to 12 C atoms wherein one or two nonadjacent $CH_2$-groups may also be replaced by —O—, —CO—, —COO—, —OCO— and/or —HC=CH—;

n and m can each, independently, be 0 or 1;

Y is H or F;

X is F, Cl, $OCF_3$ or $OCHF_2$; and,

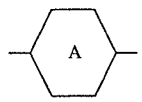

is trans-1,4-cyclohexylene or 1,4-phenylene.

23. A display according to claim 1, wherein the thickness of said alignment layer is 0.001–1 μm.

24. A display according to claim 22, wherein said display contains at least one compound of the formula

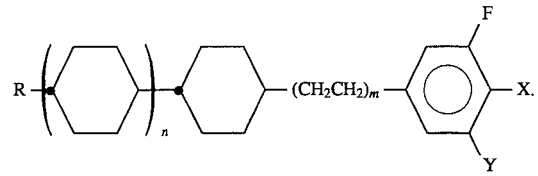

25. A display according to claim 22, wherein said display contains at least one compound of the formula
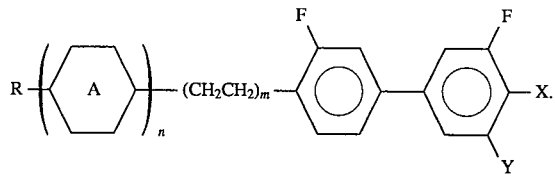
26. A display according to claim 22, wherein said display contains at least one compound of the formula
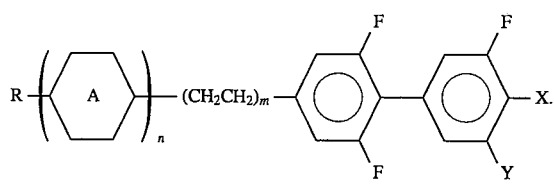
* * * * *